United States Patent Office 3,266,939
Patented August 16, 1966

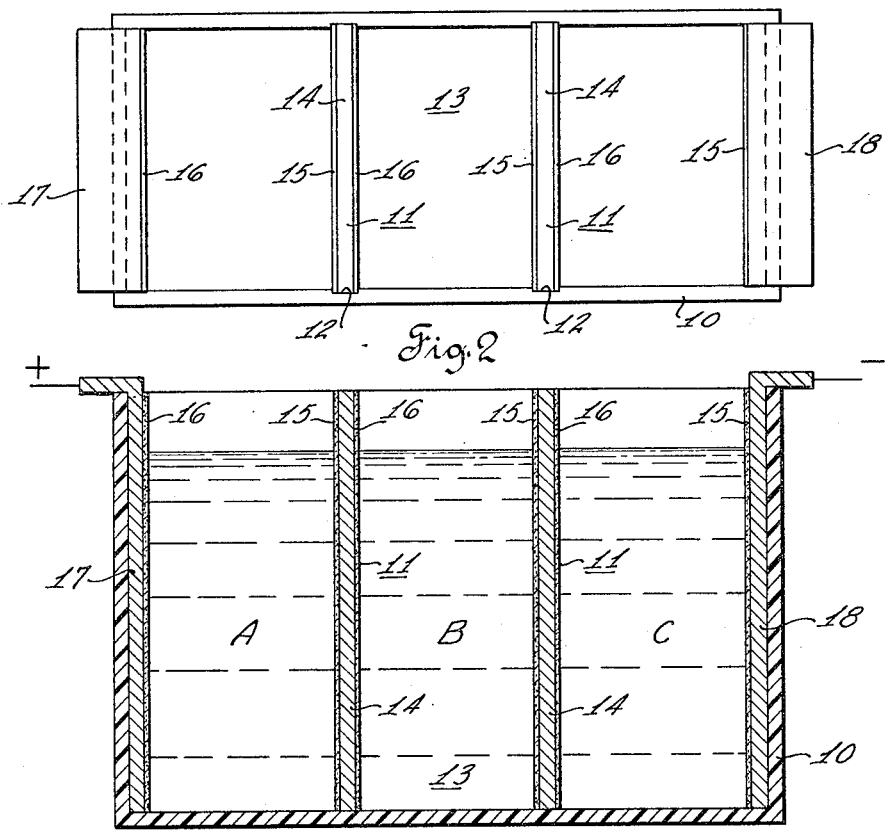

3,266,939
FUEL CELL
James W. Adam, West Allis, and Bruce H. Fiedler, Milwaukee, Wis., assignors to Allis-Chalmers Manufacturing Company, Milwaukee, Wis.
Filed Jan. 26, 1961, Ser. No. 85,112
4 Claims. (Cl. 136—86)

This invention relates to new and useful improvements in the direction production of electrical energy from liquid fuels and more particularly to an improved low temperature, catalyst activated liquid fuel cell.

Fuel cells for the direct production of electrical energy from liquid fuels with gaseous oxidants have been known heretofore. These cells comprise a fuel electrode and an oxygen electrode which are spaced apart in an electrolyte bath which may or may not include a liquid fuel admixed therewith. The electrodes are generally hollow, such as hollow cylinders. The gaseous oxidant, such as oxygen, air or halogen, is passed through the interior of the hollow oxygen electrode, while the liquid fuel is passed to the interior of the hollow fuel electrode.

The present invention is predicated in part upon the discovery that hollow porous electrodes are no longer necessary to the operation of low temperature catalyst activated liquid fuel cells and in part upon the discovery that a highly effective liquid fuel cell can be produced utilizing a single solution containing the electrolyte, the fuel and the oxidant all in liquid form.

The mechanism of this fuel cell involves the adsorption and activation of the oxidant and the fuel on the cathode and anode electrodes, respectively, whereupon the active species formed react with or to produce the ion carriers in the electrolyte and liberate the required charges to the separate electrodes. The electrical charges on the electrodes are then routed through an external circuit as current which may be put to work.

Disadvantages of prior art fuel cells include the need for extraneous equipment for the preparation, direction and control of gaseous oxidants, and the need for special dies and processing equipment to create electrodes having the desired hollow structure.

Accordingly, a prime object of the present invention is to provide an improved fuel cell of the type described which overcomes these disadvantages of the prior art.

A further object of the present invention is to provide a liquid fuel cell which has increased current density and in which the internal resistance of the cells is significantly reduced.

Another object of the present invention is to provide a liquid fuel cell which produces a high current output through the utilization of a solution consisting of fuel, electrolyte and a highly reactive liquid oxidant.

Another object of the present invention is to provide a liquid fuel cell in which a solution of hydrogen peroxide is employed as a liquid oxidant for reaction in an electrolyte with conventional liquid fuels to produce a remarkably improved electrical power output.

These and still further objects as shall hereinafter appear are readily fulfilled in a remarkably unexpected fashion by the present invention as shall be discerned from the following description, especially when considered in conjunction with the attached drawing in which:

FIG. 1 is a side elevation of a fuel cell in accordance with the present invention; and
FIG. 2 is a plan view of the fuel cell of FIG. 1.

Referring to the drawing, a fuel cell module is shown and comprises a liquid tight housing 10 and a plurality of plates 11 inserted into a plurality of strategically placed grooves 12 and extending across the chamber 13 defined by the housing 10. The module shown comprises three cells A, B and C connected in series.

Plate 11, as shown, is one of the novel bipolar electrodes described in the abandoned application of Bruce H. Fiedler, Serial No. 86,645, filed February 2, 1961. It is, of course, understood that other of the known electrode designs may be employed in practicing the present invention with satisfactory results.

Plate 11, as shown, comprises a central portion 14, formed of an electrically conductive, caustic resistant, mechanically strong material such as nickel, stainless steel or the like, having a first and second catalytic layer 15, 16, respectively, disposed thereupon in the manner to be explained.

One of the catalytic layers, for example, layer 15 consists of a fuel activating catalyst such, for example, as those of the platinum group, that is, platinum, palladium, osmium, iridium, rhodium and ruthenium.

Catalytic layer 16 consists of a hydrogen peroxide activating catalyst such, for example, as silver, cobalt and nickel, their oxides, and mixtures of the heavy metal oxides such as iron, cobalt, nickel and silver.

Both the fuel catalyst and the oxidant catalyst may be disposed upon the central portion by electro or chemically plating, whichever is convenient, with equally desirable results. In each instance, the opposite side will be either mechanically or chemically masked.

Plate 11, thus prepared, functions both as cathode and anode. In addition, central portion 14 functions to electrically connect adjacent cells for series operation.

When plates 11 are arranged within housing 10 in slots 12, the layers 15 are all oriented in the same hand so as to face layers 16.

Unipolar electrodes 17, 18 are provided adjacent each end wall of housing 10 to maximize the use of chamber 13. As shown, electrode 17 is the cathode of cell A and electrode 18 is the anode of cell C.

One manner of operating the foregoing cell will now be described. A suitable liquid fuel, hereinafter discussed in detail, is admixed with a suitable electrolyte, such as aqueous solutions of alkali hydroxides, that is the hydroxides of potassium, lithium, sodium and the like. This ionically conductive admixture is poured into chamber 13 of housing 10. Next a small but effective amount of hydrogen peroxide sufficient to react with the liquid fuel but not so much as to waste reagent, that is, from about 0.5 to about 5 percent of the volume of chamber 13, is added to the fuel-electrolyte solution to form a highly reactive fuel-electrolyte-oxidant bath. The bath thus constituted will contain from about 5 to about 50 percent by volume of the liquid fuel and the remainder is electrolyte. A solution containing by volume about 10 percent methanol, about 3 percent peroxide and about 87 percent of saturated lithium hydroxide as electrolyte provides a highly satisfactory electrical output.

Liquid fuels of suitable solubility characteristics such, for example, as ethyl alcohol, methyl alcohol and the like, are typical of the water soluble liquid fuels acceptable to the practice of the present invention.

The liquid fuels may be either premixed with the electrolyte solution for introduction into the cell as indicated above, or they may be added separately. In any event, when the solution contains both the fuel and the peroxide, the desired chemical reaction is initiated and the desired electrical current is produced.

In one practice of the present invention, methyl alcohol is mixed with a 6 normal LiOH electrolyte and this mixture is poured into chamber 13 which surrounds plates 11. Plates 11 are supported in substantially parallel relationship to each other by slots 12 which hold them relatively loosely and divide chamber 13 into three communicating sections.

After the fuel-electrolyte mixture is disposed in chamber 13, or concurrently therewith if desired, hydrogen peroxide is added in controlled amounts into chamber 13. While in normal practice hydrogen peroxide of 2-30 percent concentration is used, the effectiveness of the cell is not at all harmed when hydrogen peroxide as strong as 100 percent concentration is used.

Peroxide is added until approximately 0.5 to 5 percent of the volume of chamber 13 defined by the housing contains $H_2O_2$. Upon the addition of the $H_2O_2$, a substantially spontaneous reaction occurs and the desired electrical current begins to flow between the cell terminals 19, 20 through an external circuit (not shown). Depending on the liquid fuel chosen, the resistance of the electrodes and the most desirable fuel: $H_2O_2$ ratio may vary but this variance is readily determinable for any given situation.

The electrodes used in the practice of this invention need not be either hollow or porous as was heretofore necessary, but, rather, may be solid plaques that are impermeable to the passage therethrough of either oxidant or fuel of the type described in the aforementioned abandoned application of Bruce H. Fiedler.

The reaction at the fuel electrode proceeds with the electrolyte and the fuel particles, i.e., both ions and molecules, being adsorbed side by side over the entire electrode surface. Upon being adsorbed, the organic fuel molecules are split by the forces of interaction caused by the active catalytic surface. The split molecules present in the chemisorbed state at the catalyst surface (a thin plate of platinum, palladium and the like) react with the electrolyte to take up hydroxyl ions and give off electrons to the fuel electrode which is thereby charged negatively. Fresh fuel molecules are continuously supplied from the liquid phase by diffusion to the electrode surface. This process continously furnishes the reaction products back into the electrolyte space.

Since the electrode, electrolyte and fuel adjoin at all points of the fuel electrode surface when mixed in accordance with this invention, the entire surface of the fuel electrode is electrochemically active as contrasted to the single boundary between the three phases in the prior art fuel cells in which liquid fuel was passed through the interior of the electrode body.

It is thus possible, in accordance with this invention, by using mixed liquid electrolyte fuel and oxidant, to increase the current density of the fuel cell. Moreover, there results, in accordance with the invention, a substantial simplification of the construction of the fuel cell since fuel electrodes can be in any desired solid form and need not be either porous or shaped with hollow bodies as heretofore required.

Due to the use of the entire surface of the fuel electrode for the electrochemical process, the internal resistance of the cell is decreased.

It should be noted that the addition of fuel, generally a poor electric conductor, will cause the specific resistance of the fuel-oxidant-electrolyte solution to increase so the portion of the reduced internal resistance is lost. On the other hand, the reactions at the fuel electrode proceed more rapidly as the fuel concentration increases so that the polarization resistance decreases as fuel concentration increases. Thus, the two portions of the internal resistance, that is, the specific resistance of the electrolyte and the concentration polarization resistance are opposite as functions of the fuel concentration, and lead to optimum of mixing conditions, which may be easily ascertained in accordance with the invention for further increasing the efficiency of this cell.

From the foregoing it becomes readily apparent that a fuel cell has been described which obviates the disadvantages attendant the prior art cells and fulfills all of the aforestated objectives to a remarkably unexpected extent.

It is of course understood that the specific embodiments herein described and illustrated are presented for illustrative purposes only and that such changes and modifications as will occur to the artisan are intended within the spirit of this invention especially as it is defined by the appended claims.

What is claimed is:

1. In a fuel cell having a housing, a nonconsumable fuel electrode carrying a catalyst selected from the group consisting of platinum, palladium, iridium, rhodium, osmium, and ruthenium, and a nonconsumable oxidant electrode carrying a catalyst selected from the group consisting of silver, cobalt, nickel and the oxides of silver, cobalt, nickel and iron mounted in said housing in spaced apart relation to each other; a unitary fuel-oxidant-electrolyte solution contained in said housing; the improvement comprising having each electrode at least partially immersed in said solution comprising by volume from about 5 to about 50 percent of a fuel selected from the group consisting of methanol and ethanol from about 0.5 to about 5 percent hydrogen peroxide oxidant, and the remainder an aqueous alkali hydroxide electrolyte.

2. A fuel cell according to claim 1 in which said fuel electrodes carry a platinum catalyst and said oxidant electrodes carry a silver catalyst.

3. A fuel cell comprising a housing having a chamber; an assembly of nonconsumable spaced apart electrode members mounted in said housing and depending into said chamber; said electrode assembly comprising a unipolar oxidant electrode, a unipolar fuel electrode, and a bipolar electrode having a fuel electrode and an oxidant electrode on opposite sides thereof; said fuel electrodes carrying a catalyst selected from the group consisting of platinum, palladium, iridium, rhodium, osmium, and ruthenium; said oxidant electrodes carrying a catalyst selected from the group consisting of silver, cobalt, nickel and the oxides of silver, cobalt, nickel and iron; a unitary fuel-oxidant-electrolyte solution disposed in said chamber comprising by volume from about 5 to about 50 percent of a fuel selected from the group consisting of methanol and ethanol, from about 0.5 to about 5 percent hydrogen peroxide, and the remainder aqueous alkali hydroxide electrolyte; and each electrode at least partially immersed in said unitary fuel-oxidant-electrolyte solution.

4. A fuel cell according to claim 3 in which said electrode members comprise a nickel sheet; said fuel electrodes carry a platinum catalyst, and said oxidant electrodes carry a silver catalyst.

References Cited by the Examiner

UNITED STATES PATENTS

| | | | |
|---|---|---|---|
| 2,706,213 | 4/1955 | Lucas | 136—161.1 |
| 2,773,561 | 12/1956 | Hunter | 183—115 |
| 2,912,478 | 11/1959 | Justi et al. | 136—86 |
| 2,925,454 | 2/1960 | Justi et al. | 136—86 |
| 2,969,315 | 1/1961 | Bacon | 136—86 |
| 2,976,342 | 3/1961 | Morehouse et al. | 136—86 |

FOREIGN PATENTS 521,773   5/1940   Great Britain.

WINSTON A. DOUGLAS, *Primary Examiner.*

JOHN R. SPECK, *Examiner.*

H. FEELEY, *Assistant Examiner*